E. BUEHLE AND E. C. HUTCHINSON.
SAFETY CONTROL FOR HYDRAULIC PIPE LINES.
APPLICATION FILED JUNE 6, 1921.

1,421,904.

Patented July 4, 1922.

Inventors,
E. Buehle
E. C. Hutchinson
By Ackert Totten
Attorneys.

UNITED STATES PATENT OFFICE.

ERICH BUEHLE, OF SAN FRANCISCO, AND ELY C. HUTCHINSON, OF OAKLAND, CALIFORNIA, ASSIGNORS TO PELTON WATER WHEEL CO., OF SAN FRANCISCO, CALIFORNIA, A CORPORATION OF CALIFORNIA.

SAFETY CONTROL FOR HYDRAULIC PIPE LINES.

1,421,904.   Specification of Letters Patent.   Patented July 4, 1922.

Application filed June 6, 1921. Serial No. 475,515.

*To all whom it may concern:*

Be it known that we, ERICH BUEHLE, a citizen of Germany, and ELY C. HUTCHINSON, a citizen of the United States, residing the said BUEHLE in the city and county of San Francisco and State of California, and the said HUTCHINSON at Oakland, county of Alameda, State of California, have invented certain new and useful Improvements in Safety Controls for Hydraulic Pipe Lines, of which the following is a specification.

The present invention relates to a safety means particularly designed for use in connection with hydraulic installations, such as pipe lines, and by the employment of which an outlet or vent is provided in case of a considerable increase in pressure, due to surges or water hammer, either in the line or penstock to a point largely in excess of normal.

Devices have been constructed for this purpose but the same have been found to be of such complicated nature as to introduce into the design elements and stresses very difficult to analyze, and which have always required allowances to be made, and since these allowances must necessarily be assumed, the devices have been found of doubtful operation and unreliable as a safety means under all conditions.

The present invention has for its principal object to provide an exceedingly simple device capable of rupture at a known pressure to afford an outlet or escape for damaging pressures occurring within the system, whereby relief is immediately afforded and liability of damage to the apparatus is overcome.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1:
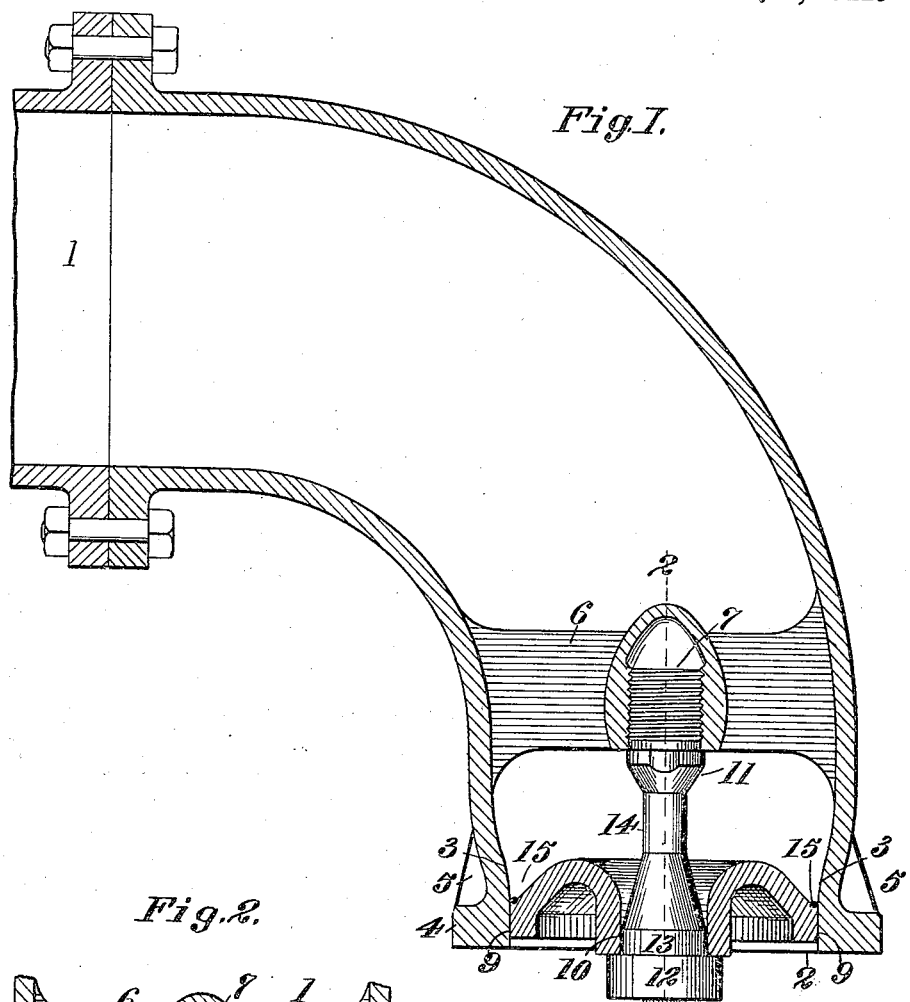
Fig. 1 is a sectional view of an escape or outlet with one embodiment of our invention applied thereto.
Figure 2:
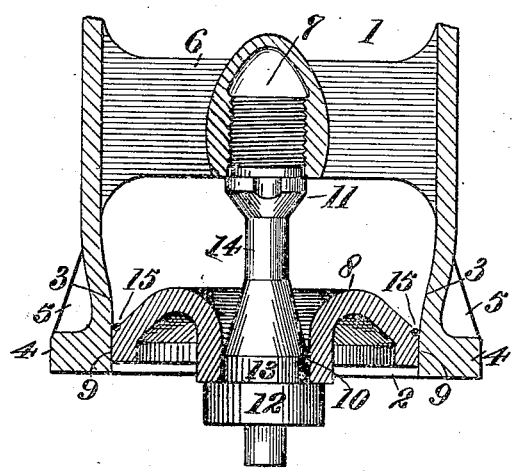
Fig. 2 is a sectional view on line 2—2 of Fig. 1.

Referring more particularly to the drawings, wherein like characters of reference designate corresponding parts—1 indicates a hydraulic penstock or pipe line or other container to which is connected one end of a branch outlet pipe 2, the outer end of which is slightly contracted as at 3 and carries a reinforcing flange 4 and strengthening ribs 5.

A web or spider 6 extends transversely across the interior of the pipe 2 at a point removed inwardly from the outlet end thereof, and the same is formed with a threaded opening 7 disposed centrally of the outlet of the pipe 2. A head or closing disk 8 is adapted for insertion within the open end of the pipe 2 and is formed with an annular surface 9 disposed in a plane corresponding to the plane of the inner wall of the discharge end of pipe 2, as in the drawings, and said disk is of a diameter to fit within said discharge end of pipe 2. The disk 8 is formed centrally with an opening 10 disposed to align with the opening 7 when the disk is in a position to close the outer end of pipe 2.

A head securing or tension member 11 is inserted within the opening 10 and is threaded into the web or spider 6, said tension member at its outer end being preferably formed with a retaining flange 12 adapted to overlie that portion of the head surrounding the opening 10, and to retain said head in a position to close the discharge end of pipe 2. The tension member 11, which is constructed of any suitable material, and which is adapted to rupture on the disk 8 being subjected to a pressure in excess of normal, is preferably formed within said flange 12 with a portion 13 of a diameter to snugly fit within the opening 10 and the shank of said tension member is preferably reduced in area, as at 14, or mutilated in such manner that said shank will break on the disk being subjected to a known pressure at the discharge end of the pipe 2.

Suitable packings 15 are positioned in coacting relation between the periphery of the disk 8 and inner surface of the discharge end of pipe 2 and beneath the underside of the flange 12 to afford a water-tight connection between the respective parts.

The device being assembled as in the drawing, operates in the following manner. The tension member 11 being made with a minimum cross section 14 at one point within its length and the area of which is calculated to maintain the disk to close the end of pipe 2 against the pressure therein within the required limit of safety will on the subjecting of the disk 8 to a pressure in excess of the predetermined safety limit of the portion 14 of the member 11 fail to support this excess load and the same will be ruptured, thereby enabling the disk 8 to be blown from the head, providing a wide open discharge end for the pipe 2 affording a material relief of the excessive pressure within the penstock or container. It will be obvious that the rupturing pressure of the portion 14 of the member 11 is considerably below the rupturing pressure of the pipe 2 or its associated conveying members.

Having thus described our invention what we claim as new and desire to secure by Letters Patent of the United States is:—

1. A pressure relief for the described purpose comprising a pipe affording a chamber connected at one end to a hydraulic pressure container and open at its opposite end, a head removably associated with the open end of said chamber for normally closing the same, and a single frangible member passing centrally through the head and detachably secured to the interior of said pipe for normally retaining said head in position to close said opening, said member adapted for rupture to release said head on the subjecting of said head to a pressure in excess of the normal pressure within said chamber and affording a full opening in the pipe on the rupturing of said single member.

2. A pressure relief for the described purpose comprising a pipe affording a chamber connected at one end to a hydraulic pressure container and open at its opposite end, a head removably associated with the open end of said chamber for normally closing the same, and a single frangible member of known strength adapted to rupture at a pressure less than a rupture pressure of said pipe extending centrally through said head for maintaining said head in place to close said opening, whereby on the rupture of said member by an internal pressure within said pipe in excess of normal a full relief area is afforded.

3. A safety control for hydraulic pipe lines comprising a pipe affording a chamber connected at one end to a hydraulic pressure container and open at its opposite end, a removable head receivable within the open end of said pipe for closing the other end of the chamber, said head being exposed to the full pressure within said chamber, and a single frangible member passing centrally through the head for holding the head in position to close said pipe end, said member being of known resistance and adapted to rupture under a pressure greater than normal pressure within the pipe and less than the rupture pressure of said pipe.

4. A safety control for hydraulic pipe lines comprising a pipe affording a chamber connected at one end to a hydraulic pressure container and open at its opposite end, a spider extended across said pipe, a removable head for reception within the end of said pipe for closing the same and a frangible head retaining member of known strength and adapted to rupture on said head being subjected to a pressure greater than the normal operating pressure within the pipe and less than the rupturing pressure of said pipe, said member extending centrally through said head and engaging said spider for normally maintaining said head in closed position in said pipe, and affording a full opening in the pipe on the displacing of the head therefrom.

5. A safety control for hydraulic pipe lines comprising a pipe affording a chamber and connected at one end to a hydraulic pressure container and open for the full area of its opposite end, a spider extended across said pipe within its open end, a head removably received within the open end of the pipe for normally closing the same, said head provided with a central aperture, a headed securing bolt extended through said aperture and threaded into said web for retaining said head in position to close said pipe, said bolt adapted for rupture to release said head on the same being subjected to a pressure below the bursting pressure of said pipe and above the normal pressure within said pipe.

In testimony whereof we have signed our names to this specification.

ERICH BUEHLE.
ELY C. HUTCHINSON.